United States Patent [19]

Petelin et al.

[11] Patent Number: 4,641,033

[45] Date of Patent: Feb. 3, 1987

[54] APPARATUS AND METHOD PREVENTING RADIATION INDUCED DEGRADATION OF OPTICAL ELEMENTS

[75] Inventors: Andrei N. Petelin, Rockville; Celia M. Sharp; Michael G. Ury, both of Bethesda, all of Md.; Gene R. Wooden, Sterling, Va.

[73] Assignee: Fusion Systems Corporation, Rockville, Md.

[21] Appl. No.: 683,521

[22] Filed: Dec. 19, 1984

[51] Int. Cl.$^4$ ............................................. G21G 1/00
[52] U.S. Cl. .............................. 250/492.1; 250/504 R
[58] Field of Search ............... 250/492.1, 492.2, 493.1, 250/494, 503.1, 504 R; 350/253

[56] References Cited

U.S. PATENT DOCUMENTS

| | | | |
|---|---|---|---|
| 1,791,254 | 2/1931 | Brockdorff | 350/253 |
| 2,442,913 | 6/1948 | Abrams et al. | 350/253 |
| 3,111,570 | 11/1963 | Strang et al. | 350/482 |
| 3,495,259 | 2/1970 | Rocholl et al. | 219/522 |
| 4,232,228 | 11/1980 | Reich et al. | 250/492.1 |
| 4,355,861 | 10/1982 | Sebald | 350/61 |
| 4,523,806 | 6/1985 | Kojima et al. | 350/96.25 |
| 4,532,427 | 7/1985 | Matthews et al. | 250/504 R |

OTHER PUBLICATIONS

Multilayer-Resist Lithography, pp. 49–55, Pieter S. Burggraaf.
Multilayer Resists for Fine Line Optical Lithography, pp. 155–160, E. Ong, E. L. Hu.
A Practical Multilayer Resist Process for 1 μm Lines, (5 pages), Thomas Batchelder & Clifford Takemoto.
Oxygen-Associated Trapped-Hole Centers in High--Purity Fused Silicas, pp. 313–326, M. Stapelbroek, D. L. Griscom, E. J. Friebele and G. H. Sigel, Jr.
Point Defects and Radiation Damage Processes in α--Quartz, pp. 98–109, David L. Griscom.
Effects of Ionizing Radiation on Amorphous Insulators, pp. 63–72, D. L. Griscom and E. J. Friebele.
Sources and Applications of Ultraviolet Radiation, p. 182, Roger Phillips.

*Primary Examiner*—Bruce C. Anderson
*Assistant Examiner*—Paul A. Guss
*Attorney, Agent, or Firm*—Pollock, Vande Sande & Priddy

[57] ABSTRACT

An apparatus and method for maintaining an optical element at a sufficiently high temperature during transmission of radiation by the optical element to prevent radiation degradation of the optical element by an increase in the absorption of at least one wavelength of the radiation. The material of the optical element is such that the absorption of the wavelength(s) concerned temporarily decreases upon annealing the optical element. The optical element may be kept at the temperature required by a wide variety of heating techniques, including gas convection heating, direct contact heating, and radiant heating. The heated optical element may be employed in optical systems for transmitting radiation from a source of radiation to a target to be exposed to this radiation.

16 Claims, 8 Drawing Figures

FIG 6

```
3 22 84    NEWMICRO BULB  SN 574 ILLUMINATOR
108, WITH 499RW OPTICAL SYS., NO HEATING TAPE
        INTERVAL    IRRAD       INTES. IRRAD.
         (NM)     (MW/SQ.CM)   (MW/SQ.CM)
        200-205      .205         .205
        205-210      .488         .693
        210-215      .854        1.547
        215-220     1.381        2.928
        220-225     2.123        5.051
        225-230     2.809        7.86
        230-235     2.842       10.702
        235-240     1.218       11.92
        240-245      .243       12.163
        245-250      .303       12.466
        250-255      .422       12.888
        255-260      .693       13.581
        260-265      .677       14.258
        265-270      .277       14.535
        270-275      .195       14.73
        275-280      .141       14.871
```

FIG 7

INTEGRATED MIMIR READING OF 9.15508 OVER BAND OF 210 240nm.
CALIBRATION FILE FEB. AT 650 MAMPS TO LAMP

MAX SIGNAL (VOLTS) .0163614164

OUTPUT OF ILLUMINATOR (COATED OPTICS) AFTER 2400 HRS. WITHOUT HEATING 3 22 84 NEWMICRO BULB SN 574
ILLUMINATOR 108, OPTICAL SYSTEM 499RW WITH HEATING TAPE

| INTERVAL (NM) | IRRAD (MW/SQ.CM) | INTEGR. IRRAD (MW/SQ.CM) |
|---|---|---|
| 200-205 | .202 | .202 |
| 205-210 | .899 | 1.101 |
| 210-215 | 1.804 | 2.905 |
| 215-220 | 2.883 | 5.788 |
| 220-225 | 3.913 | 9.701 |
| 225-230 | 4.32 | 14.021 |
| 230-235 | 3.942 | 17.963 |
| 235-240 | 1.557 | 19.52 |
| 240-245 | .292 | 19.812 |
| 245-250 | .338 | 20.15 |
| 250-255 | .379 | 20.529 |
| 255-260 | .735 | 21.264 |
| 260-265 | .711 | 21.975 |
| 265-270 | .284 | 22.259 |
| 270-275 | .189 | 22.448 |
| 275-280 | .133 | 22.581 |

INTEGRATED MIMIR READING OF 15.103 MW/SQ CM OVER BAND OF 210-240 nm.
CALIBRATION FILE FEB AT 650 MAMPS TO LAMP

MAX SIGNAL (VOLTS) .022222222

OUTPUT OF ILLUMINATOR OF FIG.7 AFTER BEING HEATED WITH THE HEATING TAPE FOR ABOUT 2 HRS. AT 300-350°C

FIG 8

APPARATUS AND METHOD PREVENTING RADIATION INDUCED DEGRADATION OF OPTICAL ELEMENTS

TECHNICAL FIELD

The present invention relates to an apparatus and method for heating an optical system so as to prevent a loss of or a reduction in the transmittance of radiant energy because of radiation induced degradation of one or more of the elements of an optical system.

BACKGROUND OF THE INVENTION

In the development of modern optical systems, efforts were concentrated initially on developing optical materials of high transmittance and coatings for optical elements that would reduce reflection from element surfaces of the wavelengths to be transmitted by the optical system. It was later recognized that radiation-induced defects in silica and other optical materials could also interfere with the transmittance of desired wavelengths of the radiation. The study of radiation-induced defects in silica based glasses intensified with the advent of fiber optics and the use of photolithography in the manufacture of semi-conductor chips and other electronic devices. Thus, the performance of high purity, highly-transparent glasses can be significantly reduced by absorption bands developing as a result of the inherent incidence of radiation on the glass materials from which the lenses of an optical system may be made.

The principal effect of radiation on highly-transparent glasses of silica or similar optical materials is the creation of molecular or atomic defects such as the creation of electron vacancies or "holes" which may become trapped at certain trapping sites present in glass. Trapping sites might involve atomic vacancies, interstitials sites, strained bonds, multivalent ions, and the like. In addition, high doses of ionizing radiation of sufficiently high energies may serve to create additional trapping sites, particularly an atomic vacancy or an atomic impurity (interstitial). Unpaired electrons also may comprise a radiation induced optical defect. Either unpaired electrons or holes trapped in a silica material may result in optical absorption bands at energies lower than the intrinsic band gap of the material.

Radiation generated defects in high-purity fused silica have been referred to as "oxygen-associated trapped-hole centers" (OHC's). While not wishing to be bound by any one theory, it is postulated that such absorption defects may be caused by electrons trapped at interstitial vacancies within the ordered structure of the silica. Thus, the term "trapped hole centers". Because of the long optical path-lengths inherent in fiber geometry, light absorbing defect centers, even at very low concentrations, can seriously degrade optical fiber performance. Such radiation induced defect centers in high purity, fused silica are also of particular interest in many applications other than fiber optics because silica is a prototype for many glassy radiation transmissive materials. One such application is photolithography which in recent years has facilitated more effective and inexpensive manufacture of semi-conductor devices, such as transistors and integrated circuit wafers.

In the practice of photolithography, a pattern in an optical mask, which corresponds to the features of the integrated circuit to be manufactured, is imaged onto a semi-conductor wafer with radiant energy such as electron beams, gamma rays, X-rays or ultraviolet light. The wafer is coated with a radiation sensitive photoresist composition, which changes chemically during exposure to the radiation over areas determined by the pattern in the mask. After exposure, the photoresist coating is developed, and the semi-conductor wafer is further processed by etching away areas determined by the imaged pattern. The process may be repeated on the wafer until the desired integrated circuit has been fabricated. Such semi-conductor devices are the building blocks of virtually all consumer, industrial and military electronic apparatus today, such as computers, calculators, automated equipment, and communications equipment, including televisions, radios, and stereos.

One radiation source which may be used for conventional photolithography is ultraviolet light which may be provided by an electrode arc lamp generating UV wavelengths of about 260-460 nanometers (nm). In the fabrication of integrated circuits, it is desirable to reduce the size of circuit features as much as possible so that more circuit components may be included on a single integrated circuit wafer of a given size. However, as the resolution of imaged lines approaches one micrometer in width, the conventional UV wavelengths are too long and result in defraction effects which impair effective imaging. This is because at such narrow circuit line widths, the slits allowing the radiation to pass through the mask have dimensions that are relatively close to the wavelength of the UV radiation being used, which significantly influences the behavior of the radiation as it passes through the slits of the mask.

One solution to this problem has been the use of an imaging radiation medium having a shorter wavelength than conventional ultraviolet. While several approaches have been proposed, including the use of X-rays and electron beams, the most promising approach has been the use of deep ultraviolet light having wavelengths in the range of 190-260 nm. Accordingly, a suitable deep UV photoresist known as polymethyl methacrylate (PMMA) has been developed and currently is in use. Molecular bonds of this resist material are broken by exposure to deep UV light so that exposed portions of PMMA coated on a substrate can be removed from substrate by an etching solution or the like. However, one disadvantage of this solution which has kept deep UV from realizing its full potential for providing integrated circuits of greater density has been that the spectral output of optical systems for deep ultraviolet light has deteriorated with age due to the development of a radiation induced absorption band centered at about 215 nm.

In order for an ultraviolet illuminator to be effective for deep UV photolithography, it must expose the photoresist coating to a certain minimum dose per unit area. In addition to producing a high total dose, the source of deep UV radiation must also produce a certain minimum brightness (light flux) for efficient optical transfer to the photoresist area of the wafer. Radiation degradation of the spectral output of a deep UV optical system increases the on-line time required for exposure of the photoresist coating of each wafer. This in turn may result in unacceptable long processing times and consequently low yields per unit time of completed semi-conductor devices. For example, the degradation of an optical system having lenses made of quartz by exposure to deep ultraviolet radiation for a period of about 1,000 hours can double the on-line exposure time required for each semi-conductor wafer. Such degradation may also cause the level of light flux to fall below the minimum irradiance required.

Although high temperature annealing for several hours has been investigated for its effects upon radiation-induced defect centers in high purity fused silicas, these investigations have been for the purpose of developing a hypothetical model of the defect structure and have not suggested a method of heat treatment for commercial application. In addition, significant differences have been observed in the annealing behavior of defect centers in different silica compositions and these differences are not well understood. In some cases, the amount of absorption of certain optical bands has increased with annealing and in others the amount of absorption has decreased with annealing.

It has also been suggested to heat optical elements in instruments such as telescopes, television cameras, periscopes, bombsights and similar sighting and/or recording devices to prevent the condensation of moisture on these optical elements. Such condensation may result in fogging of the optical elements whereby visibility is impaired. Such heating devices have been suggested where the temperature of the optical instrument is lower than the dew point temperature of the ambient atmosphere so as to prevent water condensation on the cooler surfaces of the lenses or other optical elements. Heating components for conventional optical systems include placing electrical resistance heating rings or coatings in direct contact with a lens surface or between different layers of a sandwich-like lens structure. Lenses also have been heated by heating air around or adjacent to the lenses.

DISCLOSURE OF THE INVENTION

The purpose of the present invention is to provide a method and apparatus for preventing significant losses of transmittance because of radiation induced degradation of highly transmissive elements in optical systems for coupling a source of radiation to a target. More particularly, a means is provided for heating one or more optical elements to a temperature sufficiently high to prevent significant losses of transmittance by reason of increased absorption of at least one wavelength by radiation-induced defect centers. The optical materials with which this invention is concerned are those in which the population of defect centers can be reduced by heating the optical material to an elevated temperature above ambient for "annealing" out these defects. As used in this specification, "annealing" refers to maintaining an optical element at an elevated temperature for only a relatively short period, namely, 1 to 10 hours, preferably 3 to 5 hours. Where an absorption band can be decreased by annealing, it was suggested initially that, upon resumption of irradiation, the absorption band would reappear at about the same rate of degradation as observed with a new, unexposed optical element. To the contrary, the results of tests leading up to the present invention demonstrate that the rate of absorption degradation is much more rapid than was anticipated from a review of existing literature. It was thus discovered that after annealing, the amount of absorption increases very rapidly so that the same level of absorption is reached after only a fraction of the dose required to reach this level of absorption during the first time of exposure.

Through use of the present invention, the increase of radiation absorption with time, by either a new or a used optical element, is substantially eliminated so that the performance of fiber optics will not be impaired with time and the length of time required for photolithographic exposure of semi-conductor wafers can be maintained substantially constant. Additionally, the invention overcomes other problems and disadvantages associated with radiation induced degradation of high purity fused silica and equivalent materials. Further objects of the invention are described in the paragraphs below.

A principal object of the present invention is to provide a method and apparatus for preventing deterioration of an optical system upon exposure to a wide range of radiation wavelengths, including gamma radiation, X-ray radiation, electron radiation, and both near and deep ultraviolet radiation.

Another object of the invention is to provide a method and apparatus for preventing radiation induced degradation of fiber optic waveguides so as to ensure the integrity of fiber communications systems and data links, even where the optical path links exceed many kilometers.

A further object of the invention is to provide a method and apparatus for performing deep ultraviolet photolithography in which the instantaneous light flux per unit area (irradiance) and the total amount of deep ultraviolet energy delivered to the target (dose) do not significantly decrease with time because of radiation induced degradation of the optical system of the photolithographic UV illuminator.

Another object of the invention is to provide a method and apparatus which are capable of printing narrow lines in the photoresist coating of semi-conductor wafers short exposure times that do not increase significantly in length over periods of use much greater than has heretofore been possible.

A further object of the invention is to provide a radiant energy illuminator having an output spectrum which does not deteriorate significantly with the energy of the radiation to which the optical system of the illuminator is exposed over long periods of use.

Another object of the invention is to provide a deep ultraviolet illuminator having an output spectrum which does not deteriorate significantly with age.

Yet another object of the invention is to provide novel heating arrangements for maintaining the lenses of an optical system at a temperature sufficiently high to prevent development of radiation induced absorption of one or more wavelengths within the band of radiation to be transmitted by the optical system during operating of the optical instrument of which it is a part.

The above objects and advantages are realized by the present invention which comprises a source of radiation, a target to be exposed to radiation from this source, an optical system for transmitting this radiation from the source to the target, and a heating means for maintaining the transmissive elements of the optical system while in use at a temperature sufficiently high to prevent radiation induced degradation of the output of the optical system. The optical system includes at least one transmissive element of a material which upon exposure to the radiation in the absence of the heating means would become degraded by an increase in its absorption of at least one wavelength of the radiation. Preferably, the material of the element also is such that the radiation induced absorption is reversible upon annealing the element at an elevated temperature.

The radiation transmitted by the optical system may be any type that induces increased absorption of at least one wavelength of the radiation by the material of the transmissive element(s). The types of radiation known to cause such degradation include gamma radiation, X-ray radiation, electron beam radiation, and near and deep ultraviolet radiation. The transmissive material may be any material of relatively high transmittance which undergoes degradation by increased absorption of at least one wavelength upon continuing exposure to a band of radiation including this wavelength. The lens preferably comprises a high purity fused silica, more preferably quartz, and most preferably a "wet" synthetic quartz having an OH radical content of at least about 1500 ppm. Synthetic quartzes of this type are available as Spectrasil from Thermal American Corporation of Montville, N.J.; as Corning Quartz 7940 from Corning Glass Corporation of Corning, N.Y. and as Suprasil from Hereaus-Amersil of Seyreville, N.J. Although the transmissive element may be a fiber optic, it is preferably a lens used in an optical system comprising an optical coupling means between a source of radiant energy and a target to be irradiated by this energy. The lens material altered by irradiation may be either the body of the lens proper or a coating on the lens body. Coatings may be thin films used to improve lens transmittance by reducing reflection, namely, antireflective coatings. Where such coatings contain a crystalline material, such as silica, alumina or an equivalent material, irradiation may create defect centers in the same manner as in a lens body of the same types of materials. Although lens containing optical systems may be employed in a wide variety of devices, one of the preferred devices employing such an optical system is an illuminator for irradiating a target.

A wide variety of target structures may be exposed to the radiation from the illuminator for a wide variety of purposes. One such purpose is to expose a radiation sensitive coating on a substrate which may then be developed to bring out the pattern of the exposure. One such target is a semi-conductor wafer coated with an ultraviolet sensitive photoresist composition which changes chemically during exposure to ultraviolet radiation over areas determined by the pattern of an optical mask. The pattern of the optical mask may correspond to the features of an integrated circuit to be imaged onto the wafer. After exposure to the ultraviolet radiation, the photoresist is developed and the semi-conductor wafer is further processed by etching away areas determined by the imaged pattern. Although a conventional ultraviolet light source providing UV wavelengths of 260-460 nm may be used, a special ultraviolet light source providing deep ultraviolet radiation having wavelengths between about 190 nm and about 260 nm is preferred. Such a deep UV light source is described in copending U.S. patent application Ser. No. 362,825 filed Mar. 29, 1982, the entire contents of this copending application being incorporated herein by reference.

One embodiment of an optical system employing the invention includes multiple lenses for transmitting and adapting deep UV radiation for its desired end use in the manufacture of integrated circuit wafers. At least one of these lenses upon exposure to the radiation becomes degraded by an increase in the absorption of at least one wavelength of the radiation, such as 215 nm. The material of the degraded lens is such that this increase in absorption is reversible, at least to some extent, by heating the lens to a significantly higher temperature for at least one hour, preferably two to five hours (annealing). The lens material comprises a silica, preferably a wet, fused silica such as quartz.

The invention further includes means for heating the entire optical system and/or the degradable lense(s) itself so as to maintain the lens during its use for transmission of the radiation at a sufficiently high temperature to prevent a significant increase in the absorption of the wavelength(s) concerned. The heating means preferably maintains the lense(s) at a temperature of at least 280° C., more preferably about 300° C.-400° C., and most preferably about 300° C.-350° C., at all times during exposure of the lense(s) to radiation of the wavelength(s) concerned. The maximum temperature that may be employed in practicing the invention depends upon the thermal stability of the lens mounting, as well as the lens and/or its coating, and generally should be at least about 100° C. or more below the temperature at which the most sensitive of these materials would become unstable.

A number of different apparatuses may be used as the heating means. A preferred heating means comprises mounting the optical elements in a chamber of metal or other heat conductive material and heating the walls of the chamber with a heating device employing an electrical resistance wire or coating so that the optical elements are heated by irradiation. Where the chamber contains a fluid, such as air, the fluid in the chamber also is heated and this fluid in turn heats the optical elements by convection. This heating means is particularly effective where lenses of an optical system are made of a glass having relatively poor heat conductive characteristics. Thus, the lenses are immersed in hot air or another gas so that the outer surfaces of the lenses are heated directly by contact with this heated medium. Such irradiation and convection heating can be supplemented by conduction heating from a heat source in contact with a lens mounting of heat conductive material. A preferred heating device is a ceramic band heater available as model CCX 363 from Tempco, Inc., of Franklin Park, Ill. Heating tape containing an electrical resistance wire or layer also may be used.

Another preferred method of lens heating is to attach an electrical resistance heating means directly to each lens to be heated. For example, a metallic resistance coating or electrical resistance tape may be placed along a peripheral portion of the lens so as not to interfere with the optical path of the optical system.

Heating means of the types described above can be found in the prior art in connection with devices to prevent water condensation on the optics of cameras and the like. An example of a heating chamber for a camera lens is described in U.S. Pat. No. 2,442,913 to Abrams, et al., the entire contents of which are incorporated herein by reference. An example of a resistance element for heating a mounting in conductive contact with a lens is described in U.S. Pat. No. 1,791,254 to Von Brockdorff, the entire contents of which are incorporated herein by reference. Examples of metallic layers or other electrical resistance coatings for conductive heating of optical lenses are described in U.S. Pat. No. 3,495,259 to Rocholl, et al., and U.S. Pat. No. 4,355,861 to Sebald, the entire contents of these two patents being incorporated herein by reference. An example of a heated glass sandwich for optical instruments is described in U.S. Pat. No. 3,111,570 to Strang, et al., the entire contents of which are incorporated herein by reference.

The invention has utility in any field utilizing transmissive lenses of glass or other materials that undergo optical degradation in the presence of radiation. The invention is especially useful in the fields of fiber optics and photolithography. The various heating means described are applicable to both of these applications. For example, fiber optic waveguides can be heated either by hot convection gases such as air or by direct contact with an electrical resistance tape or coating. Similarly, the lenses of photolithographic illuminators may either be mounted in a heated chamber containing hot convection gases or contacted directly with electrical resistance coatings or tape. A more particular application of the invention is for illuminators used in performing deep ultraviolet photolithography for the manufacture of integrated circuits on semi-conductor wafers and other substrates.

BRIEF DESCRIPTION OF THE DRAWINGS

The invention may be further understood by referring to the accompanying drawings in which.

DESCRIPTION OF BEST MODE AND OTHER EMBODIMENTS FOR CARRYING THE INVENTION

Figures 1, 2:
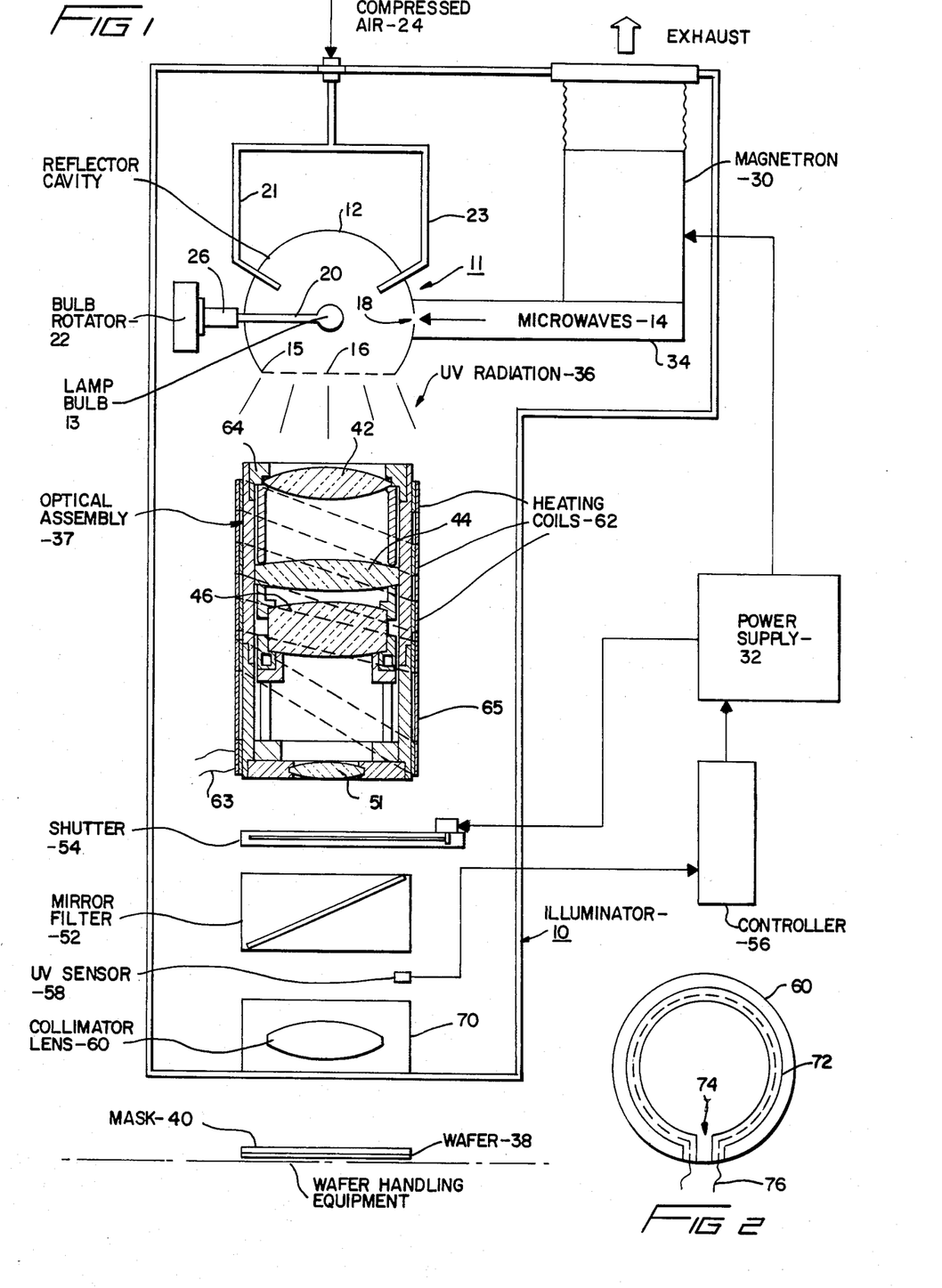
FIG. 1 is an illustration of the invention as used in an illuminator for performing deep ultraviolet photolithography.
FIG. 2 illustrates the use of a heating tape to heat an individual lens.

FIG. 1 illustrates an exemplary illuminator 10 using an optical system in accordance with the present invention. Referring to this figure, an electrodeless lamp 11 comprises a microwave chamber 12 containing a lamp bulb 13 excitable by microwave energy 14. Microwave chamber 12 has a circular aperture 15 covered by a planar circular mesh 16 which is secured to the spherical wall of chamber 12. Both the spherical and mesh portions of chamber 12 are made of a conductive material such as copper or aluminum. Additionally, a portion of the inner surface of the chamber wall opposite to aperture 15 may be coated with a deep UV reflecting material.

The spherical wall of chamber 12 also has a rectangular slot 18 in the position shown for coupling microwave energy to the lamp bulb. The envelope of lamp bulb 13 is preferably spherical in shape and is disposed at the center of spherical chamber 12. The envelope is made of high purity, high OH (wet) quartz, which is a highly transmissive material for deep UV radiation. Bulb 13 has a quartz stem 20 for mounting the envelope in the chamber. In order to provide cooling of bulb 13 during its operating, the bulb is rotated by an electric motor 22 while streams of compressed air are directed at the bulb by nozzles 21 and 23 which are connected by appropriate conduits to a source of compressed air 24. Bulb stem 20 is in effect an extension of motor shaft 26.

Microwave energy 14 is generated by a magnetron 30 which is energized by a power supply 32. Microwave energy 14 is fed from magnetron 30 to chamber 12 through slit 18 by a rectangular waveguide 34. Lamp bulb 13 is filled with a plasma forming medium, such as mercury dispersed in a noble gas, and the microwave energy passing through slot 18 excites the plasma substantially throughout the volume of the bulb envelope. This causes the bulb envelope to emit ultraviolet radiation which is directed through the ultraviolet transmissive window formed by circular mesh 16. It has been found that the radiation that is emitted by such electrodeless lamps is much richer in the deep UV part of the radiation spectrum than the radiation omitted by conventional UV arc lamps.

The spherical envelope of lamp 13 therefore effectively emits a uniform stream of ultraviolet radiation 36 in the direction of a lens array in the form of an optical assembly 37. Assembly 37 forms part of an optical train for coupling the ultraviolet radiation exiting from mesh 16 to wafer 38 as efficiently as possible. A mask 40 for providing an irradiation pattern to a photoresistive coating on wafer 38 is disposed in contact with the wafer coating. The system illustrated in FIG. 1 is therefore known as a contact or proximity photolithographic system. However, as indicated above, the invention is applicable to a wide variety of other types of optical systems and apparatuses, including those for merely transmitting, e.g., fiber optics, and also projecting types having a projector instead of an illuminator.

Optical assembly 37 may be comprised of a series of lens elements, such as lenses 42, 44, 46 and 51 shown diagrammatically in FIG. 1. Lenses 42, 44 and 46 interact to form a condensor array. Downstream of lens 46 is a collimating lens 51.

The optical train further includes a filter mirror 52 which reflects the longer ultraviolet wavelengths and the visible and infrared components of the radiation while transmitting deep ultraviolet wavelengths in the range of 190 to 260 nm. The UV light transmitted by optical assembly 37 to filter mirror 52 is fed through a shutter 54 which controls the duration (amount) of the ultraviolet radiation to which semi-conductor wafer 38 is to be exposed. Shutter 54 is electronically controlled in conjunction with power supply 32 for magnetron 30 by a controller 56 which controls the shutter speed and lamp bulb intensity in response to an ultraviolet senser 58 so as to provide the desired dose of radiation to the coating on semi-conductor wafer 38.

The final element of the optical train is a collimating lens 60 which transmits a uniform UV radiation field to mask 40. The collimated field is large enough to fill the required diameter of the wafer surface with ultraviolet light of the required irradiance as formed by the optics of optical assembly 37.

Because of its high transmittance of deep UV radiation, high purity, high OH content quartz is a preferred material for the multiple lenses of optical assembly 37 and collimator lens 60, as well as for the envelope of bulb 13. One or more of these lenses also may be coated with an optical coating composition to provide a thin film of anti-reflective material.

In accordance with the present invention, the lenses of optical assembly 37 are each heated to and maintained at a temperature of at least about 280° C., preferably a temperature in the range of about 300°-400° C., more preferably a temperature in the range of about 300° C.-350° C., during operation of the illuminator. Heating is preferably accomplished by ceramic heating bands 62 containing a resistance wire 63 connected to a source of electricity (not shown). The bands may be wound in spiral coils around a cylindrical lens housing 64, which is preferably of aluminum, steel or some other heat conductive material. The heating bands may be enclosed in a casing 65 clamped around housing 64. Housing 64 preferably contains a gas, such as air, which also is heated and transfers heat from the walls of the housing to each of the lenses by gas connection.

In the absence of such heating of optical assembly 37, the time required to deliver the desired dose of radiation to the surface of semi-conductor wafer 38 can double in about 1,000 hours of operation due to ultraviolet degradation of the lenses of the optical train. This degradation is in the form of significant increases in the absorption band which develops at and on either side of about 215 nm as previously described. This degradation has been found to be particularly pronounced in lenses occupying the position of lens 46 in FIG. 1.

The heating of collimator lens 60 may be optional because this lens is subjected to much lower levels of ultraviolet radiation than the lenses of optical assembly 37. However, in many applications, it also may be desirable to maintain the temperature of collimator lens 60 at the elevated temperatures specified above during operation of the illuminator. Lens 60 may be heated by wrapping coils of a heating band or tape around a conductive lens mounting 70 in a manner similar to the application of heating bands 62 around housing 64 of optical assembly 37. As an alternative, the collimator lens 60 may be provided with an annular heating tape 72 in conductive contact with the lens material. Heating tape 72 is preferably located outside of the optical path near the periphery of lens 60 so as not to interfere with the useful optical area of the lens or otherwise impair its transmission capabilities. The annular shape of tape 72 is interrupted at one location by a narrow radial gap 74 so that resistance wire 76 within the tape can be connected to a source of electrical energy (not shown). As previously indicated, a thin layer of metal or other electrically resistive material may be coated directly onto the body of the lens to provide an annular ring-like structure similar to that of tape 72. Such coatings also are capable of conductively heating an optical lens. The provision of an electrically resistive coating on a lens is described in U.S. Pat. No. 3,495,259 which already has been referred to above. Direct conductive heating of lenses by heating tape or other coatings also may be used for each of the lenses in optical assembly 37 as an alternative or supplement to the heating of housing 64 by heating bands 62.

According to the invention, therefore, radiation degradation of optical elements, such as lenses and fiber optics waveguides, is prevented by maintaining these optical elements at a temperature above that at which the lens material could be annealed to remove defect centers or other causes of selective absorption of certain wavelengths which develop upon prolonged irradiation of these elements. Such heating may be achieved by a number of different techniques, including irradiation, hot air convection and/or direct contact with a heating member such as a heating tape or a thin layer of metal or other coating placed on one or more surfaces of the optical elements. Where a heating member is in direct contact with an optical element, it is positioned so as not to interfere with the optically useful area of the element or the equipment in which it is located.

The width, thickness and length of a heating member in direct contact with the material of an optical element are selected to achieve the level of sustained heating desired, and depend on the size of the optical element to be heated and the available power supply. The amount of electrical resistance necessary for a required heat output can be determined by conventional means. If the central portions or other optically useful area of a lens cannot be heated sufficiently on account of the temperature gradient between the heated periphery and the optically useful area, an increase in the heating temperature of the resistance member may be necessary. Alternatively, supplemental heating may be provided by direct radiative heating and/or convection heating with hot gases such as air, particularly where the optical elements are enclosed within a housing of heat conductive material. In such optical embodiments, heating of the housing causes direct radiative heating of the lens and also will heat air within the housing for convection heating of the lenses. Heat also may be transmitted to the optical elements by conduction through lens mountings of conducting material.

Figure 3:
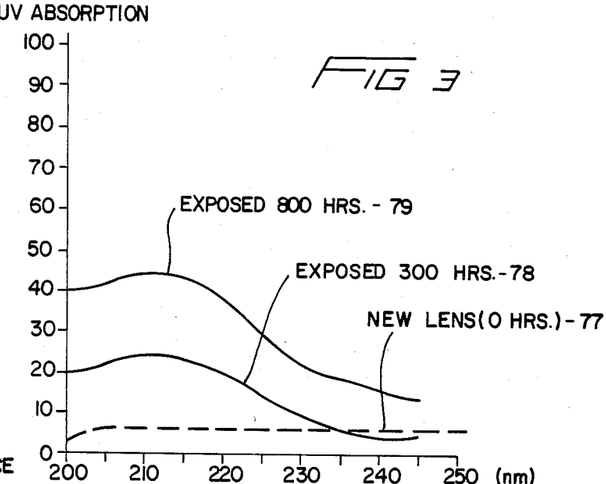
FIG. 3 is a diagram containing graph for comparing the absorption of a new lens with that of lenses degraded by deep ultraviolet radiation for different periods of time.

Degradation in the presence of deep ultraviolet radiation may first become noticeable after about 200 hours of exposure at an irradiation level of about 150 milliwatts per square centimeter. Accordingly, the total amount (dose) of ultraviolet energy accumulated after 200 hours at this irradiation level is about 100 kilojoules per square centimeter. The amount of absorption in the wavelength band around 215 nm increases with further irradiation and becomes particularly pronounced after about 800 hours, which exposure time at 150 milliwatts per square centimeter is equivalent to a total accumulated dose of about 400 kilojoules per square centimeter. This phenomenon of increased ultraviolet absorption with increased time of exposure is illustrated in FIG. 3 for different lenses which have been exposed to about 150 milliwatts per square centimeter of deep ultraviolet radiation for different lengths of time. Thus, line 77 represents the level of absorption by a new lens, line 78 the absorption of a lens exposed for 300 hours, and line 79 the absorption of a lens exposed for 800 hours.

The lenses measured in developing the data for FIG. 3 were those occupying the position of lens 46 of FIG. 1 taken from three different optical assemblies, one being new and the other two being exposed for the times indicated. The transmittance of each of these lenses was measured separately with a laboratory set-up using a deuterium lamp producing a deep ultraviolet continuum in the range of 200-250 nm. The output from the deuterium lamp was directed through a small, round hole in a diaphragm to create a narrow beam of deep ultraviolet radiation through the middle of the lens. This narrow beam was then passed through a diffuser and into the slit of a monochromator apparatus for measuring the intensity of radiation as a function of its wavelength. The output of the monochromator was then fed to a computer for storage and subsequent printout of the graphs making up FIG. 3. The same laboratory set-up used for FIG. 3 also was used in developing the data of FIGS. 4–6 discussed below.

Figure 4:
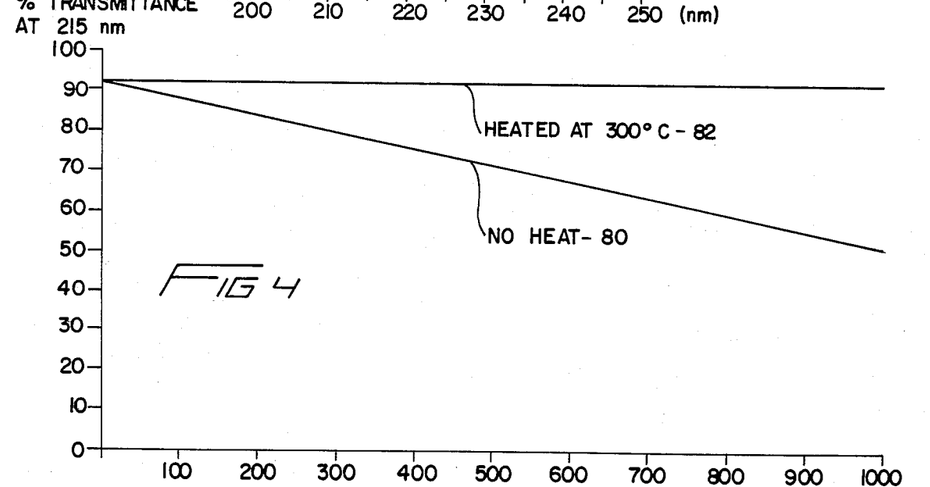
FIG. 4 is a diagram containing graphs comparing the transmittance of an irradiated lens heated according to the present invention with an irradiated lens that was not heated.

Referring to FIG. 4, this figure illustrates the change in transmittance of a lens element at 215 nm with the time of exposure without the application of heat (line 80). This figure further illustrates that where another lens element is maintained continuously at 300° C., the radiation degradation represented by line 80 does not occur even after 1,000 hours of exposure (line 82).

Figure 5:
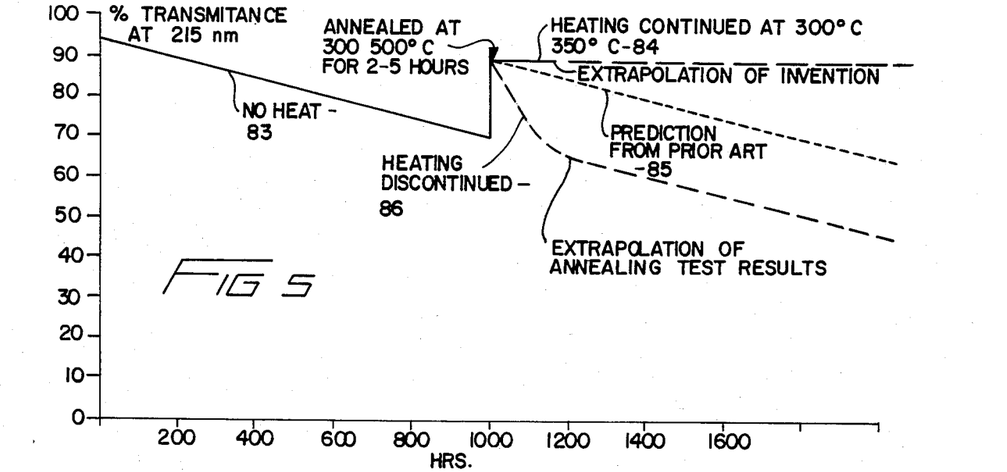
FIG. 5 is a diagram containing graphs comparing the effect of continuous heating and the effects of temporary annealing of irradiated lenses.

In FIG. 5, there is shown the graph of two lenses that are each irradiated without heating for the first 1,000 hours of operation and accordingly undergo degradation as indicated by the single line 83 starting at about 95% transmittance and decreasing to about 70% transmittance. Both lenses were then annealed at about 400° C. for about 3 hours. Irradiation was then resumed for about another 100 hours of operation with a continuation of heating to at least about 300° C. of the lens represented by line 84 and a discontinuance of heating of the lens represented by line 86. The dotted line 85 between lines 84 and 86 is a representation of what had been predicted from prior literature on the possible effects of annealing radiation degraded slicia. As indicated by the rapid divergence of lines 85 and 86, the unheated lens after being annealed returned to its degraded state at a rate far exceeding its rate of degradation as a new lens. The extremely rapid degradation of an annealed lens as shown by line 86 was an entirely unexpected result of testing related to the present invention. In marked contrast, the annealed lens of which heating was continued did not exhibit any such degradation but maintained its annealed transmittance at a level which is only about 3–5 percent less than that of a new lens. The broken portions of lines 84 and 86 beyond 1,100 hours are not based on actual measurements but represent an extrapolation of the performance of these lenses based on the test results described.

Figure 6:
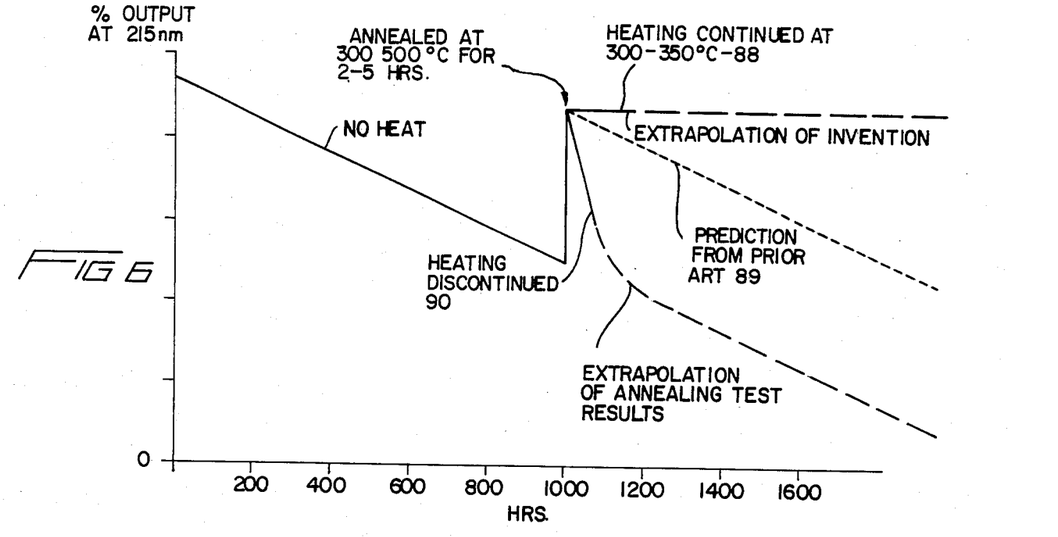
FIG. 6 is a diagram similar to FIG. 5 except the graphs are for optical systems of six lenses instead of a single lens.

FIG. 6 is similar to FIG. 5 except that the graphs represent a summation of the transmittance of all lenses in optical assemblies corresponding to optical assembly 37 of FIG. 1, instead of the transmittance of a single lens such as lens 46. Thus, line 88 represents an optical assembly 37 that is not heated for 1,000 hours but is then wrapped with a heating tape and thereafter heated to about 300° C. for the remainder of its exposure to deep ultraviolet radiation. For comparison, line 90 is representative of an optical assembly 37 which is annealed only for about 3 hours at about 400° C. and thereafter heating is discontinued upon further exposure of the assembly to deep ultraviolet radiation. Again, the unexpectedly rapid degradation of the annealed assembly was observed and is illustrated by the rapid divergence of line 90 from a dotted line 89 representing what had been predicted from prior literature on the possible effects of annealing radiation degraded silica.

Figure 7:
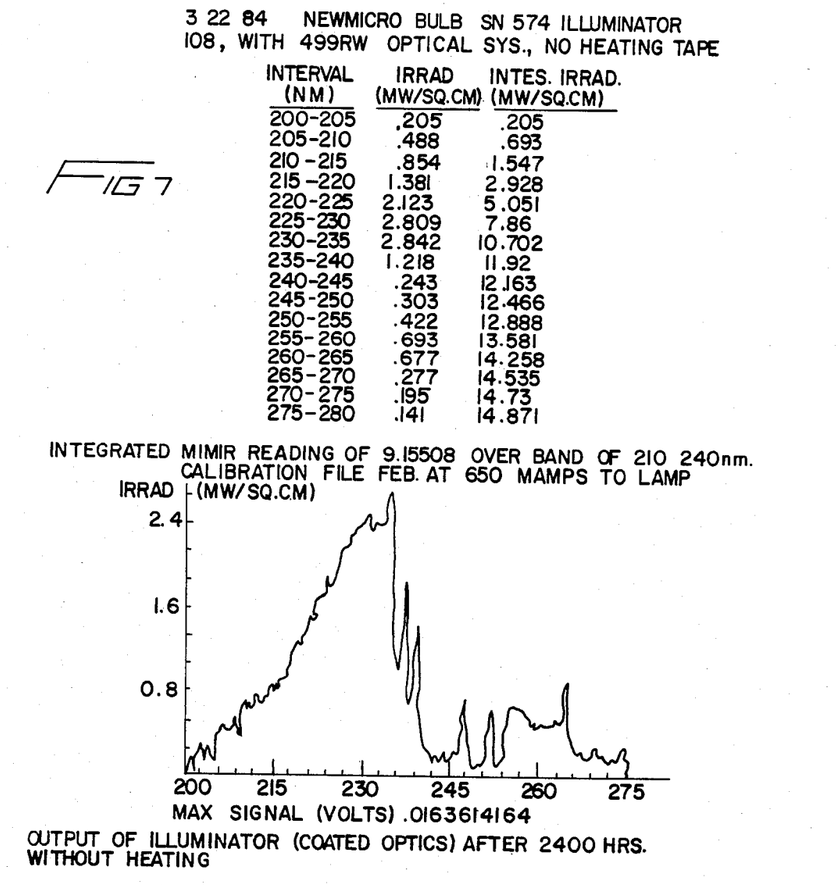
FIG. 7 is a table and a graphical representation of the data in the table illustrating the output of a deep ultraviolet illuminator after 2,400 hours of operation without heating of the optical system.
Figure 8:
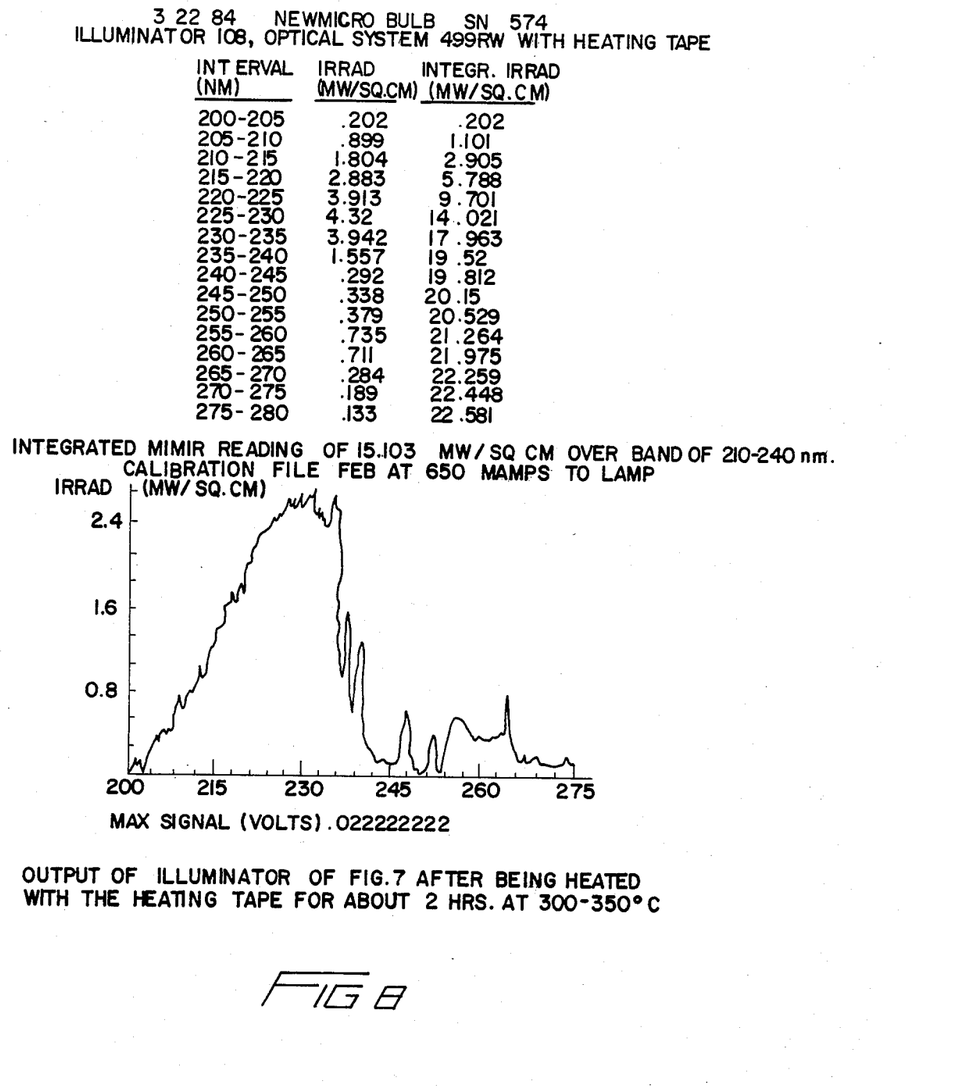
FIG. 8 is a table and a graphical representation of the data in the table illustrating the output of a deep ultraviolet illuminator annealed at 300° C.-350° C. for about 2 hours after 2,400 hours of operation without heating of the optical-system in accordance with the invention.

FIGS. 7 and 8 represent a comparison of the total output of an illuminator of the type shown in FIG. 1 without use of the heating band 62 and after annealing for about 2 hours with use of the heating band 62, respectively. In this illuminator, each of the lenses were coated with an antireflective coating to decrease reflection and thereby increase transmittance of the deep ultraviolet radiation. The test set-up for these measurements was basically that shown in FIG. 1 except that the wafer 38 and mask 40 were eliminated and the UV sensor 58 moved into the plane vacated by wafer 38. In this case, the ultraviolet sensor was the detector element of an irradiation measuring apparatus known as a "Mimir" which is capable of measuring the level of irradiation over relatively short intervals or bands of deep ultraviolet radiation. Thus, the irradiation in milliwatts per square centimeter was measured for each band width of 5 nm from 200 nm to 280 nm. These band width intervals and the measured irradiation by these wavelengths are shown in the first two columns of the table portions of FIGS. 7 and 8. The last column of these tables is a summation of the second column to give the integrated amount of radiation incident upon the UV sensor over the entire range from 200 nm to 280 nm.

The graph portion of FIGS. 7 and 8 is a plot of the first two columns of the table, with the total area under the curve from 200 nm to 280 nm in increments of 5 nm being given by the third column of the table. The illuminator tested had been operated for 2,400 hours, which was the time of exposure of the optical system to deep UV irradiation and is indicative of the total dose delivered to the optical elements. Prior to making each set of measurements, the ultraviolet lamp 13 was operated for about 20 minutes in order to achieve stability within the optical system.

The nomenclature of the table portion of FIGS. 7 and 8 is further described as follows. The tests were run on Mar. 22, 1984. There is then given the serial number of the lamp bulb, the illuminator unit number, and the optical assembly number. The optical assembly providing the data for FIG. 7 had no heating band throughout 2,400 hours of illuminator operation. A heating band was then applied to the optical assembly of FIG. 7 and was activated to heat this optical assembly to about 300°–350° C. for about 2 hours in order to provide the data for FIG. 8. The headings of the table have already been explained above.

The nomenclature of the graph portion of FIGS. 7 and 8 is further described as follows. To show particularly that the invention eliminates degradation at wavelengths on either side and at about 215 nm, a band of from 210 nm to 240 nm was selected and the irradiation measured by the Mimir instrument was integrated over this range. The integrated irradiation without heating over this band width was 9.1 milliwatts per square centimeter as compared to an irradiation of 15.1 milliwatts per square centimeter where the optical system had been heated to more than 300° C. for an annealing period of about 2 hours. Annealing invention thereby resulted in an increase of over 60% in the level of UV irradiation delivered by the illuminator to the semi-conductor wafer in the wavelength range of 210 nm to 240 nm. The remaining nomenclature associated with the graph portions of FIGS. 7 and 8 indicate that the lamp was calibrated in February at a power supply level of 650 milliamperes and 3.4 kilovolts, and that the ultraviolet sensor generated a maximum signal of 0.16 volts for the unheated optical system as compared to a maximum signal of 0.22 volts for the heated optical system.

Although it could not be confirmed by experimental data, some of the measured degradation indicated by FIG. 7 may have been due to radiation degradation of the composition with which the lenses were coated. In this regard, the invention is also applicable to optical coatings which upon exposure to radiation become degraded by an increase in absorption by the coating of one or more wavelengths of the radiation to which the coating is exposed. This degradation must then be reversible upon annealing the coating. In other words, coatings may also contain silica and other materials that can be degraded by exposure to radiation and then annealed to temporarily remove such degradation. Maintaining these coatings at a temperature above the annealing temperature throughout exposure of the coating to radiation will avoid such radiation degradation in the same manner that degradation of a silica lens is avoided by application of the invention.

There thus has been disclosed a method and apparatus for preventing radiation degradation of optical elements and systems employed in a wide variety of applications, such as fiber optics and deep ultraviolet photolithography. The numerous advantages realized by practicing the invention have heretofore been discussed in detail. The heating methods and apparatuses disclosed for practicing the invention may find use in numerous processes other than fiber optics and photolithography. Accordingly, while specific preferred embodiments have been illustrated and described, many variations of these embodiments will fall within the scope of the invention which is defined only by the claims below.

What is claimed is:

1. In an optical apparatus for transmitting ultraviolet radiation from a source of said ultraviolet radiation to a target to be exposed to said ultraviolet radiation;
   an optical system having at least one optical element comprising a radiation transmissive silica which upon exposure to said ultraviolet radiation at ambient temperature becomes degraded by an absorption of at least one wavelength of said ultraviolet radiation that increases with the time of said exposure, and which upon being annealed at a temperature in the range of about 300° C. to about 400° C. reverses said degradation by a decrease in said absorption; and,
   heating means for maintaining said optical element at an elevated temperature in the range of about 280° C. to about 400° C. substantially at all times during transmission of said ultraviolet radiation by said optical system, said elevated temperature being sufficiently high to prevent a significant amount of said degradation.

2. The apparatus of claim 1 in which said ultraviolet radiation includes deep ultraviolet radiation having wavelengths in the range of 190 nm to 260 nm.

3. The apparatus of claim 1 in which the material of said optical element comprises a high purity, high OH content silica.

4. The apparatus of claim 3 in which said material comprises a highly transmissive synthetic quartz.

5. The apparatus of claim 1 in which said elevated temperature is in the range of about 300° C. to about 400° C.

6. The apparatus of claim 5 in which said elevated temperature is in the range of about 300° C. to about 350° C.

7. The apparatus of claim 1 in which said heating means comprises a chamber having a wall of heat conductive material, means for supporting said optical element within said chamber, and means for heating said wall to a temperature sufficiently high to maintain said optical element at said elevated temperature.

8. The apparatus of claim 7 in which said means for heating said wall comprises an electrical resistance means for causing said wall to heat said optical element by radiant heating.

9. The apparatus of claim 8 in which said electrical resistance means comprises an electrical resistance band or tape extending along a surface of said wall.

10. The apparatus of claim 7 in which said heating means includes a gas in said chamber, means for supporting said optical element within said chamber in contact with said gas, and means for heating said gas.

11. The apparatus of claim 1 in which said heating means comprises electrical resistance means in direct contact with said at least one optical element.

12. The apparatus of claim 1 in which said optical system comprises a transmissive body and a transmissive coating covering at least a portion of a surface of said body within an optically useful area thereof, and in which said optical element comprises said coating.

13. A method for preventing degradation of an optical element for transmitting ultraviolet radiation from a source of said ultraviolet radiation to a target to be exposed to said ultraviolet radiation, said optical element comprising a radiation transmissive silica which becomes degraded upon exposure to said ultraviolet radiation at ambient temperature by an absorption of at least one wavelength of said ultraviolet radiation that increases with the time of said exposure, and which is annealable at a temperature in the range of about 300° C. to about 400° C. to reverse said degradation by a decrease in said absorption, said method comprising:
   activating said source of ultraviolet radiation so that said optical element transmits said ultraviolet radiation from said source to said target; and,
   heating said optical element so as to maintain the temperature of said optical element in the range of about 280° C. to about 400° C. substantially at all times during activation of said ultraviolet radiation source to prevent a significant amount of said degradation.

14. The method of claim 13 which further comprises the steps of degrading said optical element by exposing said optical element to said ultraviolet radiation at ambient temperature for a period of time sufficient to substantially increase the absorption of at least one wavelength of said ultraviolet radiation, and thereafter annealing said degraded optical element at a temperature in the range of about 300° C. to about 400° C. for a period of time sufficient to remove substantially all of said degradation.

15. The apparatus of claim 1 in which a characteristic of said silica is that when a previous degradation of said optical element is reversed by said annealing, said optical element upon further exposure to said ultraviolet radiation at ambient temperature becomes degraded by an increase in the absorption of said at least one wavelength at a rate which substantially exceeds the rate of increase in the absorption of said at least one wavelength during said previous degradation.

16. The apparatus of claim 1 in which said source of said ultraviolet radiation provides ultraviolet light for performing ultraviolet photolithography, said target is a semi-conductor substrate coated with a photoresist coating, and said ultraviolet light is imaged by said optical system in an exposure plane for exposing said semi-conductor substrate to said ultraviolet light; and in which said optical system comprises a plurality of said optical elements and said heating means comprises means for maintaining each of said optical elements at said elevated temperature.

* * * * *